Patented May 18, 1943

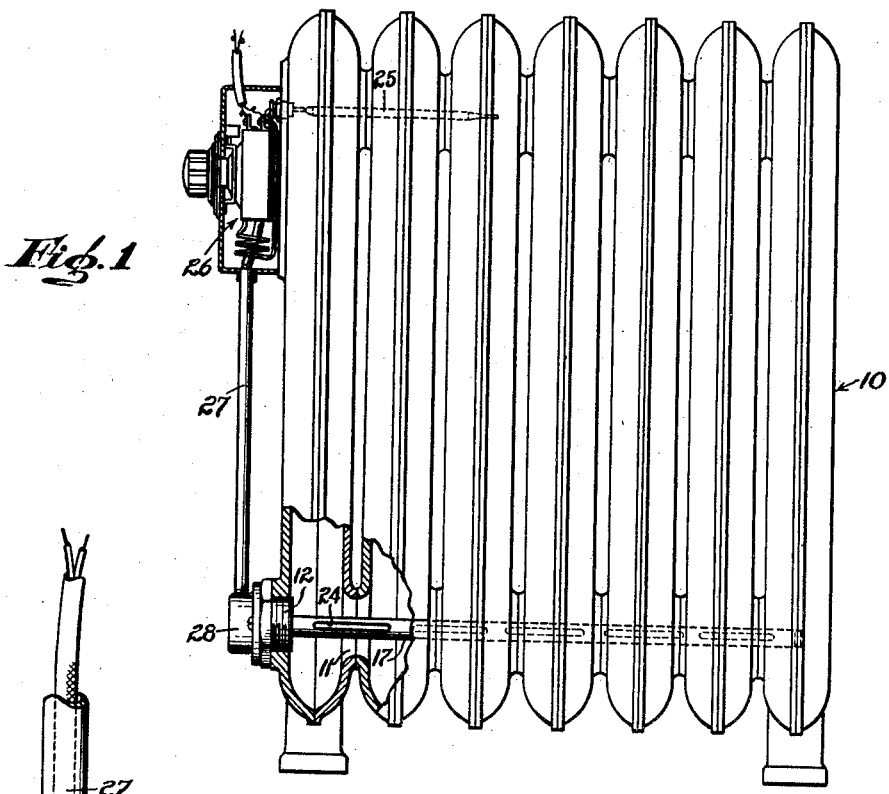
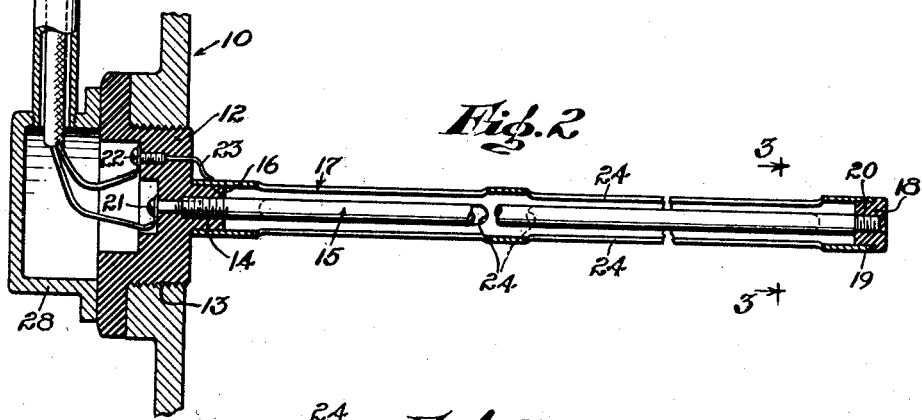
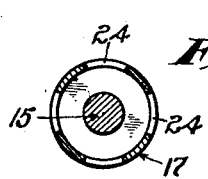

2,319,266

UNITED STATES PATENT OFFICE 2,319,266

ELECTRIC WATER HEATER

Harry A. Rush, Glendale, Calif.

Application May 20, 1941, Serial No. 394,300

6 Claims. (Cl. 219—40)

This invention relates to electric heating devices, and more particularly to a device for raising the temperature of water, and for generating steam by the passage of an electric current through the water.

In the generation of steam by the passage of current through the water, it is almost impossible to prevent the formation and collection of steam pockets, or air bubbles, in the space between the electrodes. This diminishes the amount of current which can flow between the electrodes, and accordingly, the amount of heat which can be generated by the heater. Another problem which frequently arises, in an attempt to make a heating device of reasonable size, which will at the same time deliver a large amount of heat, is the danger of arcing across the electrodes. Such arcing is destructive to the equipment, and results in large currents surging through the equipment, necessitating closing of breakers thrown open by the surges. Arcing also has a tendency to become more severe with a change in the composition of the water utilized in the heater.

In addition to the above problems, the composition of the electrodes also causes a great deal of trouble. Carbon electrodes have been used in the past, but they tend to disintegrate and wash away under conditions of use, and metallic electrodes, except for those made of the noble metals, all have a tendency to form an insulating coating when in use, and thus become useless in a very short period of time.

At the same time, the tendency of metallic electrodes, and even of carbon electrodes, to impart an unpleasant taste to the water, limits the use of this type of heating element to situations where the water is not used for human consumption, and is not likely to cause trouble by reason of the salts and other compounds generated by the use of metallic electrodes.

It is therefore an object of the present invention to provide a heating unit which will not permit the collection of pockets or bubbles of gas or air in the space between the electrodes.

It is a further object of this invention to provide an electric heater of the type described which will not have a tendency to arc.

It is a further object of the present invention to provide an electric heater of the type described which will not form an insulating coating on the electrodes over a period of use.

It is a further object of the present invention to provide an electric heating unit which will withstand the high temperatures involved in the generation of steam.

It is a further object of the present invention to provide an electric heating unit of the type described which will not impart a taste to the water being heated.

It is a further object of the present invention to provide a heating unit of the type described which will heat the water evenly over the entire surface of the heating unit.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawing:

Figure 1 is an elevation of one form of the device of the present invention, shown partly in section;

Figure 2 is an enlarged section of the electrodes shown in the lower part of Figure 1; and Figure 3 is a section taken along line 3—3 of Figure 2.

The present invention has been shown in a steam radiator, adapted to be utilized for heating rooms, although it is to be understood that it can be utilized in any other heating device, or for heating water in any other environment. A radiator shell 10 of any convenient form to radiate heat into a room, is intended to be partly filled with water, which is to be heated by the passage of current through electrodes immersed in the water. As shown, a passage way 11 is provided at the bottom of the radiator shell, through which the electrodes pass.

In order to mount these electrodes in a manner which will insulate them from each other and from the shell of the radiator, a plug 12, of some insulating material capable of withstanding heat and moisture is provided. This plug is threaded into the radiator shell at 13, and is provided with a tapped bore 14, for receiving one of the electrodes 15, and with a projecting cylindrical portion 16, concentric with the bore 14, for receiving the other electrode 17, which is in the form of a cylinder, and is simply forced over the portion 16 of the plug. A spacer 18, provided with a shoulder 19, and a tapped bore 20 is utilized at the opposite end of the electrodes, and serves to maintain the electrodes properly spaced, and to hold the outer electrode firmly in place on the cylindrical part of the bushing.

In order to provide terminals for the electrodes, the inner electrode is drilled and tapped at one end to receive a screw 21, which passes through the plug 12, and provides an attachment point for the conductor leading to this electrode. The outer electrode may be connected to a similar screw 22, simply screwed into the plug 12 and connected by a conductor 23 to the outer electrode.

It will be noted that the outer, cylindrical electrode 17 is provided with slots 24 extending almost the entire length of the electrode, and which have been shown as removing more than fifty percent of the material of the tube. It has been found that, in heating water with devices of this kind, in which the electrodes are simply immersed in the body of water to be heated, that there is a tendency for the space between the electrodes to become filled with steam or air, resulting in a reduction of the amperage passing through the device and consequently the amount of power which can be converted into heat. It has been found that the use of slots of considerable extent permit a circulation in the space between the electrodes which is sufficient to drive any voids forming in the liquid out of the heating space. This problem is especially noticeable in devices which do not have a forced circulation, as by a pump or the like, and must depend upon the convection in the water to dislodge any bubbles which may form.

It is not necessary that the outer electrode be a tube with slots therein, the same result might be obtained by utilizing a plurality of small electrodes surrounding the inner electrode, but it is necessary that a large amount of free space be left for circulation through the heating space.

As was mentioned before, the danger of arcing is present when it is attempted to pass a large current through a heating device of this kind, and, at the same time, it is difficult to prevent the electrode material from being affected by the water during operation of the device. It was also mentioned that it is extremely desirable to provide some means which will heat as large a body of water as possible. All of these problems have been solved by the use of proper material for electrodes.

It has been found, in the course of experiments covering the range of commercially available materials, that the electrodes should be made of stainless steel, containing a considerable amount of chromium and nickel and normally non-magnetic. The non-magnetic properties are due to the presence of the iron of the material in the form of austenite material suitable for the use is commercially available, containing over .08% of carbon, from 16% to 26% chromium, and from 8% to 21% nickel.

Material of this type has the property of not forming an electrically insulating coating on the surface, as a result of the passage of current through water using the material as electrodes. The exact scientific reason for this is not known, but it has been determined that the result set forth is accomplished.

In addition to the requirement that the electrodes should not form an electrically insulating coating in use, it is desirable to prevent the localization of heat, and it is essential to prevent arcing between the electrodes. Unless the electrodes are close to each other, the area of electrode required becomes quite large, but electrodes which are close together have a tendency to cause arcing. For this reason, it is necessary to manufacture the electrodes of material of low conductivity, which diminishes the tendency to arc, and at the same time increases the amount of heat generated by mere passage of the current through the electrodes. Heretofore, electrodes for this use have been of carbon, and they have been given as high a conductivity as possible. As a consequence, the units have been quite large when their capacity is considered. The utilization of steel, of the composition mentioned, which has a comparatively high resistance results in a large portion of the total heat developed being generated by the passage of current through the electrodes themselves. This promotes a uniform heating throughout the entire body of water in contact with the electrodes, as, for instance, at the outer surface of the outer electrode, which ordinarily would be heated very little.

In order that the device be capable of use in practical installations, a temperature control may be installed. In the shown form, a bulb 25, of a vapor filled thermostatic element, is installed within the radiator, and a pressure responsive control 26 is employed to cut off the current when the temperature of the bulb reaches a certain value. This control is conventional, and is therefore not shown in detail. A connection from the temperature control to the electrodes may be made through the conduit 27, which is threaded into the cap 28, which is in turn secured to the plug 12.

I claim:

1. An electrode for the heating of water by passage of current through the water composed of a material including iron, the iron in the material being in nonmagnetic condition.

2. An electrode for the heating of water by passage of current through the water composed of a material including iron, said iron being in the austenitic state.

3. An electrode for the heating of water by the passage of current through the water composed of a ferrous alloy having more than .08% carbon, 16% chromium and 8% nickel.

4. An electrode for the heating of water by the passage of current through the water composed of a ferrous alloy having more than .08% carbon, 16% chromium and 8% nickel, in which the iron is in such condition as to render the material substantially nonmagnetic.

5. An electrode for the heating of water by passage of current through the water composed of a ferrous alloy, having more than .08% carbon, and chromium and nickel within the ranges of 16% to 26% and 8% to 21% respectively.

6. An electrode as claimed in claim 5 in which the iron is in the austenitic state.

HARRY A. RUSH.